Patented Apr. 19, 1938

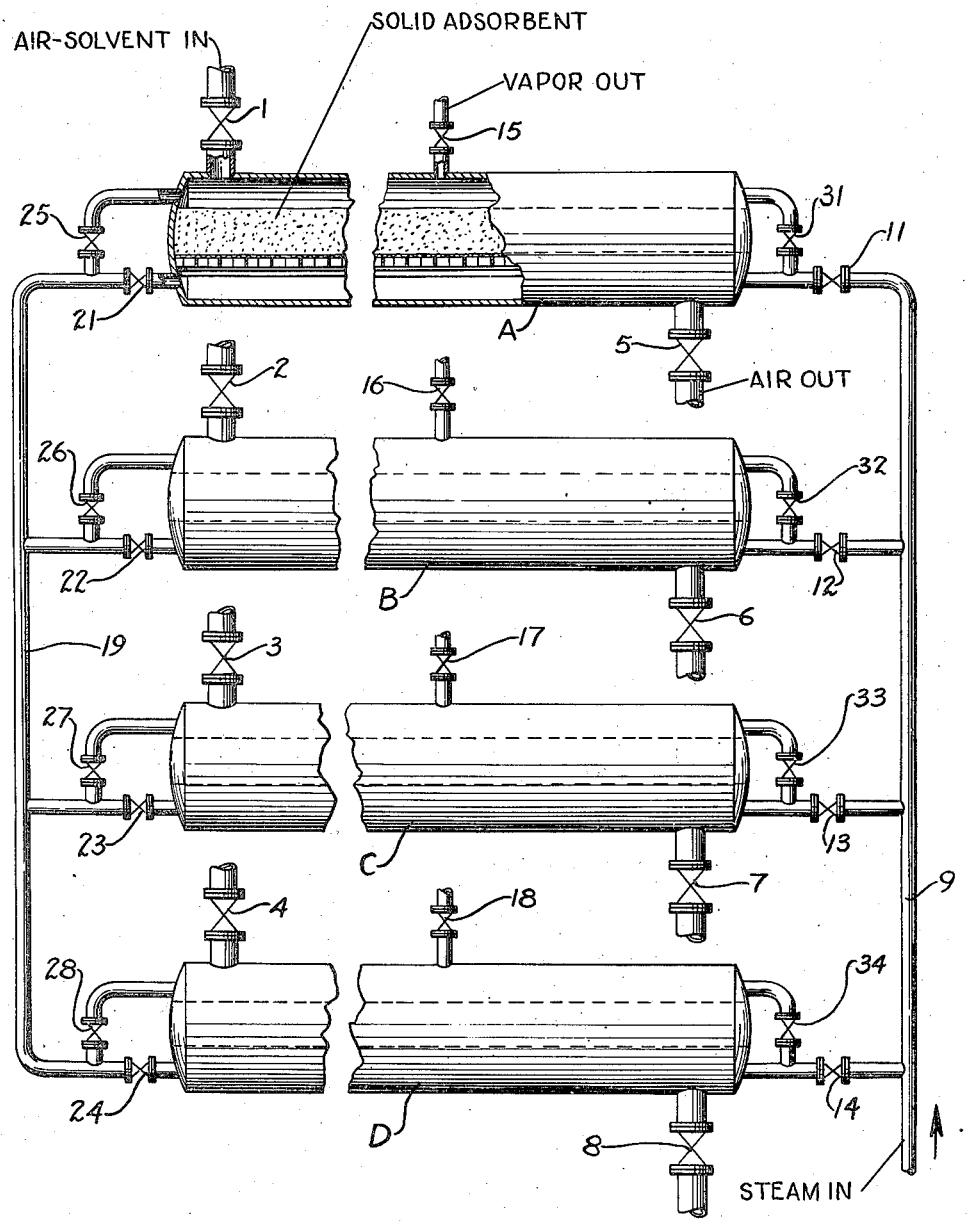

2,114,810

UNITED STATES PATENT OFFICE 2,114,810

SOLVENT RECOVERY

Arthur B. Ray, Bayside, N. Y., assignor, by mesne assignments, to Union Carbide and Carbon Corporation, a corporation of New York Application December 29, 1934, Serial No. 759,720

4 Claims. (Cl. 252—4)

The invention relates to the recovery of solvents or other valuable materials from mixtures thereof in vapor form with air or other gases, by means of solid adsorbents, such as activated carbon. It has particular reference to an improved process for removing the adsorbed material from the active adsorbent after it has become saturated therewith. The invention is especially applicable in treating air to recover solvent material which has been diffused therein by evaporation, in such industries as the manufacture of artificial silk and leather, fabric and paper coating processes, and the like. The preferred adsorbent is an activated carbon, of the type described and claimed in U. S. Patents 1,497,543 and 1,497,544, granted to N. K. Chaney.

In the usual process of this type, after adsorption of the solvent vapor by the adsorbent, it is recovered therefrom by heating with steam, and the mixed vapor of steam and solvent is then condensed and separated. With an activated carbon adsorbent it is common practice to heat the carbon without removing it from the adsorber, by passing steam in direct contact through the bed of adsorbent carbon, and leading the resulting vapor mixture of solvent and steam immediately to the condenser or rectifying equipment. By this method, at the beginning of the steaming period, a sufficient steam flow is maintained to insure rapid heating of the carbon, part of which steam is condensed and discharged from the bottom of the adsorber tank. As the solvent begins to vaporize, the steam input is decreased, but must still be held at a considerable volume to obtain a substantially complete removal of the solvent, with the result that the vapor leaving the carbon during the latter part of the steaming period contains only relatively small amounts of solvent. The vapor passing to the condensing equipment is thus very irregular in solvent concentration, and a high ratio of steam to solvent actually removed is required over the last part of the steaming period.

It is an object of my invention to improve prior solvent recovery methods, and to provide a process for liberating the adsorbed material from solid adsorbents which is much more efficient in steam consumption, effects a more complete and thorough recovery of the adsorbed material, and maintains, through a more uniform vapor concentration, less burden on the condensing and distilling equipment.

In accordance with my process, an adsorber of a structure heretofore commonly employed in solvent recovery may be used, and one is preferred which will permit heating of the solid adsorbent in situ by direct contact with steam. I propose, however, to arrange a battery of adsorbers in such a manner that two of them may be steamed simultaneously in series, over a period when one adsorber has been freed of a substantial portion of the adsorbed solvent, and the second one is in the initial steaming stage. The vapor from the first adsorber, containing a relatively small proportion of solvent, is thus passed through a second adsorber, rather than directly to the condensing equipment, and the vapor heat utilized to attain the desired temperature of the second adsorber. A sufficient steam flow can be maintained during this period to insure substantially complete removal of solvent from the first adsorber, but by further heat utilization of this steam in the second adsorber, there is effected a much lower steam requirement per pound of solvent actually recovered. A more uniform concentration of solvent in the vapor passed to the condensing apparatus is also effected in this manner.

The accompanying drawing is further descriptive of my invention, and shows diagrammatically one method of arranging a battery of adsorbers to effect this series steaming.

The four adsorbers, A, B, C, and D, are of a usual construction, consisting of horizontal cylinders, containing horizontally disposed beds of activated carbon, or other solid adsorbent, supported therein on a suitable foraminous structure. Inlets 1, 2, 3, and 4 provide to each adsorber means for admitting the air-solvent or other gaseous mixture to be treated, and the gas unadsorbed after passage through the adsorbent bed, may be taken off through the outlets 5, 6, 7, and 8 respectively. From the steam header 9, connection is made to each adsorber through the valves 11, 12, 13, and 14 respectively, permitting direct steaming of the adsorbent in a direction reverse to that of the treated air. The mixture of steam, and solvent vaporized thereby, may be led to the condensing or distilling equipment through the valves 15, 16, 17, and 18. Another vapor conduit 19 forms a direct passage between all four adsorbers, being connected to the bottom portion of each through the valves 21, 22, 23, and 24, and to the upper gas space of each adsorber by means of the valves 25, 26, 27, and 28. Valves 31, 32, 33, and 34, and the conduits associated therewith, form a direct gas passage for each adsorber between the upper and lower portions thereof. All valves shown may be arranged, if desired, for hydraulic operation from a central control station.

In operation, the adsorbing step is conducted in the customary manner by passing the air to be treated through the adsorbent until it is substantially saturated with adsorbed material. Assuming that the adsorber A has reached its practical limit of adsorption capacity, and is ready for steaming, a typical steaming cycle, in accordance with my invention, may be conducted in the following manner. The air inlet and outlet valves 1 and 5, respectively, are closed, and a series relationship is established between adsorbers A and D. The latter adsorber, it is also assumed, has reached a stage in the steaming cycle, wherein a substantial proportion of adsorbed material has already been liberated. Steam now enters adsorber D through valve 14, passes through the adsorbent bed, and instead of going directly to the condenser, is carried off through the valve 28 into the conduit 19, from which it enters adsorber A through valve 21. For a short time, sufficient to purge adsorber A of residual gases, the entering vapor is by-passed about the adsorbent through valve 31 and discharged through valve 15. It is then passed directly through the adsorbent bed, by closing valve 31, and the vapor mixture passing off is led to the condensing equipment. This latter vapor flow is continued until substantially all of the recoverable solvent has been removed from adsorber D, and the adsorbent material in adsorber A has been raised to a temperature sufficient to vaporize a portion of the adsorbed material. Steam flow through adsorber D is then discontinued, the series connection between the two adsorbers is cut off, and steam is passed directly into adsorber A by means of valve 11. Individual steaming of this adsorber continues until the larger proportion of adsorbed solvent has been removed, when it is then connected in series with adsorber B, by a proper valve manipulation clearly evident in the drawing, and the above-described series cycle is repeated between adsorbers A and B. Adsorber B, similar to A, is thus first heated up with a vapor-steam mixture from a prior adsorber, before being steamed directly, and each adsorber in turn passes through the same heating and steaming cycle.

It will be evident that any number of adsorbers may be connected in the manner indicated, and the process is especially beneficial where a battery of three or more adsorbers is used. The duration of the steaming period on each adsorber may be controlled, so that no one adsorber is out of service for any longer time than was heretofore necessary in the usual individual or batch steaming process. The actual period over which any two adsorbers should remain connected in series relation will depend upon a number of factors, such as the rate of steam flow, the nature of the adsorbed solvent as well as the adsorbent material, the capacity of the condensing equipment, etc., and this can be readily varied to suit any particular set of operating conditions. Steam can be introduced directly into the second adsorber at any time, and can be added along with, and in addition to, the steam-vapor mixture from the first adsorber, giving a very accurate control on the rate of removal of the solvent from the adsorbent. In a continuous solvent recovery installation, the heat utilization of steam is by this process greatly improved, a more effective removal of the adsorbed solvent is attained with a lower overall steam consumption per pound of solvent recovered, and a condensate of more uniform solvent composition is given off by the condensing equipment.

I claim:

1. A process for removing adsorbed solvent vapors from two or more portions of an activated carbon substantially saturated therewith, which comprises heating each portion of said activated carbon with a vapor mixture of steam and minor proportions of said adsorbed solvent from another portion thereof, and subsequently passing steam in direct contact therewith.

2. In a process for recovering solvent vapor from air by means of a plurality of activated carbon adsorbers, the step of reactivating the carbon adsorbent, which comprises passing steam in direct contact with the carbon in each adsorber to remove a substantial proportion of the adsorbed solvent, maintaining a series connection between two adsorbers during a period when one adsorber has been freed of a substantial part of the adsorbed solvent and the other adsorber is in the initial stages of reactivation, and utilizing the mixture of steam and minor proportions of solvent vapor from the first adsorber to heat up and initiate vapor removal in the second adsorber.

3. In the process for recovering condensable vapors from gas mixtures by means of a solid adsorbent, the step of removing the adsorbed vapors which comprises heating successively with steam separate bodies of said solid adsorbent arranged in series relationship, passing the steam-vapor mixture liberated from one body of adsorbent through a second adsorbent body in portions sufficient only to heat up and initiate vapor removal from said second body, and subsequently passing steam in direct contact therewith.

4. In a process for recovering solvent vapor from air by means of an activated carbon adsorbent, the step of removing the adsorbed solvent which comprises heating successively with steam separate bodies of said activated carbon arranged in series relationship, passing the steam-vapor mixture liberated from one body of activated carbon through a second body thereof in portions sufficient only to heat up and initiate vapor removal from said second body, and subsequently passing steam in direct contact therewith.

ARTHUR B. RAY.